US012626913B2

(12) United States Patent
Sasa et al.

(10) Patent No.: US 12,626,913 B2
(45) Date of Patent: May 12, 2026

(54) NEGATIVE ELECTRODE FOR SECONDARY BATTERIES, AND SECONDARY BATTERY

(71) Applicant: Panasonic Intellectual Property Management Co., Ltd., Osaka (JP)

(72) Inventors: Tatsuro Sasa, Kyoto (JP); Yuta Kuroda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 532 days.

(21) Appl. No.: 18/028,368

(22) PCT Filed: Sep. 9, 2021

(86) PCT No.: PCT/JP2021/033089
§ 371 (c)(1),
(2) Date: Mar. 24, 2023

(87) PCT Pub. No.: WO2022/070818
PCT Pub. Date: Apr. 7, 2022

(65) Prior Publication Data
US 2023/0378448 A1     Nov. 23, 2023

(30) Foreign Application Priority Data

Sep. 30, 2020    (JP) ................................. 2020-165625

(51) Int. Cl.
*H01M 4/38*       (2006.01)
*H01M 4/134*      (2010.01)
(Continued)

(52) U.S. Cl.
CPC .......... *H01M 4/386* (2013.01); *H01M 4/134* (2013.01); *H01M 4/364* (2013.01); *H01M 4/583* (2013.01);
(Continued)

(58) Field of Classification Search
None
See application file for complete search history.

(56) References Cited

U.S. PATENT DOCUMENTS

| | | | |
|---|---|---|---|
| 5,677,082 | A | 10/1997 | Greinke et al. |
| 2016/0276668 | A1 | 9/2016 | Nagayama et al. |

(Continued)

FOREIGN PATENT DOCUMENTS

| | | |
|---|---|---|
| JP | H09-320600 A | 12/1997 |
| JP | 2019-067579 A | 4/2019 |

(Continued)

OTHER PUBLICATIONS

Extended (Supplementary) European Search Report dated Feb. 19, 2024, issued in counterpart EP Application No. 21875120.4. (7 pages).

(Continued)

*Primary Examiner* — Zhongqing Wei
(74) *Attorney, Agent, or Firm* — WHDA, LLP

(57) ABSTRACT

This negative electrode for secondary batteries is provided with a negative electrode mixture layer which comprises a binder material and a negative electrode active material that contains graphite particles and an Si-containing material; the Si-containing material contains an Si-containing material A which comprises a carbon phase and silicon particles that are dispersed in the carbon phase; in cases where the negative electrode mixture layer is divided into equal halves in the thickness direction, the average intraparticle void fraction of the graphite particles contained in the upper half region is 13% or less, and is smaller than the average intraparticle void fraction of the graphite particles contained in the lower half region.

8 Claims, 2 Drawing Sheets

(51) Int. Cl.

| | | |
|---|---|---|
| *H01M 4/36* | (2006.01) | |
| *H01M 4/583* | (2010.01) | |
| *H01M 10/0525* | (2010.01) | |
| *H01M 4/02* | (2006.01) | |

(52) U.S. Cl.
    CPC .. *H01M 10/0525* (2013.01); *H01M 2004/027* (2013.01)

(56)                References Cited

U.S. PATENT DOCUMENTS

| | | | |
|---|---|---|---|
| 2021/0159489 A1* | 5/2021 | Sugaya ................. | H01M 4/134 |
| 2021/0218014 A1 | 7/2021 | Sakitani et al. | |
| 2021/0218025 A1 | 7/2021 | Tashita et al. | |
| 2022/0013780 A1 | 1/2022 | Nishitani et al. | |
| 2022/0029150 A1 | 1/2022 | Shin et al. | |
| 2022/0344659 A1* | 10/2022 | Oura ..................... | H01M 4/133 |
| 2022/0376227 A1 | 11/2022 | Kuroda et al. | |

FOREIGN PATENT DOCUMENTS

| | | | |
|---|---|---|---|
| WO | 2019/239652 A1 | 12/2019 | |
| WO | 2019/239947 A1 | 12/2019 | |
| WO | 2020/044930 A1 | 3/2020 | |
| WO | 2020/110917 A1 | 6/2020 | |
| WO | 2020/122602 A1 | 6/2020 | |
| WO | 2021/059706 A1 | 4/2021 | |

OTHER PUBLICATIONS

International Search Report dated Dec. 7, 2021, issued in counterpart International Application No. PCT/JP2021/033089.

* cited by examiner

NEGATIVE ELECTRODE FOR SECONDARY BATTERIES, AND SECONDARY BATTERY

CROSS REFERENCE TO RELATED APPLICATIONS

This Application is the National Stage of International Application No. PCT/JP2021/033089, filed Sep. 9, 2021, which claims priority from Application No. 2020-165625 filed on Sep. 30, 2020 in Japan. The entire contents of these applications are incorporated herein by reference in their entirety.

TECHNICAL FIELD

The present disclosure relates to a negative electrode for a secondary battery and a secondary battery.

BACKGROUND

A non-aqueous electrolyte secondary battery using a carbon material as a negative electrode active material is widely used as a secondary battery having a high energy density.

For example, Patent Literature 1 discloses a non-aqueous electrolyte secondary battery using densified carbon having a particle internal porosity of less than or equal to 5% as a negative electrode active material.

In addition, for example, Patent Literature 2 discloses a non-aqueous electrolyte secondary battery using graphite and a Si-containing material having different particle internal porosities as a negative electrode active material.

CITATION LIST

Patent Literature

Patent Literature 1: JP H09-320600 A
Patent Literature 2: WO 2019/239947 A

SUMMARY

When the Si-containing material is used as the negative electrode active material, a capacity of the secondary battery can be increased, but charge/discharge cycle characteristic of the secondary battery tends to be deteriorated.

According to one aspect of the present disclosure, there is provided a negative electrode for a secondary battery including a negative electrode mixture layer including a negative electrode active material including graphite particles and a Si-containing material, in which the Si-containing material includes a Si-containing material A including a carbon phase and silicon particles dispersed in the carbon phase, and when the negative electrode mixture layer is divided into two equal parts in a thickness direction, an average value of particle internal porosities of the graphite particles included in an upper half region is less than or equal to 13%, and is smaller than an average value of particle internal porosities of the graphite particles included in a lower half region.

In addition, according to another aspect of the present disclosure, a secondary battery includes a positive electrode, a negative electrode, and a non-aqueous electrolyte, in which the negative electrode is the negative electrode for a secondary battery.

According to one embodiment of the present disclosure, charge/discharge cycle characteristic of the secondary battery can be improved using a negative electrode active material including a Si-containing material.

DESCRIPTION OF EMBODIMENTS

According to one aspect of the present disclosure, there is provided a negative electrode for a secondary battery including a negative electrode mixture layer including a negative electrode active material including graphite particles and a Si-containing material, in which the Si-containing material includes a Si-containing material A including a carbon phase and silicon particles dispersed in the carbon phase, and when the negative electrode mixture layer is divided into two equal parts in a thickness direction, an average value of particle internal porosities of the graphite particles included in an upper half region is less than or equal to 13% or less, and is smaller than an average value of particle internal porosities of the graphite particles included in a lower half region. Further, according to the negative electrode for a secondary battery as one aspect of the present disclosure, charge/discharge cycle characteristic of the secondary battery can be improved. Although the mechanism that exerts the above effects is not clear, the following is conceivable. It is considered that when graphite particles having a particle internal porosity of less than or equal to 13% and a Si-containing material A in which silicon particles are dispersed in a carbon phase are mixed, inter-particle friction is specifically increased, and a layer that is hardly crushed is obtained. Such a layer that is hardly crushed is disposed in the upper half region when the negative electrode mixture layer is divided into two equal parts in the thickness direction, such that liquid absorption of an electrolyte used in a secondary battery. Therefore, it is considered that the charge/discharge cycle characteristic of the secondary battery can be improved. In addition, since an internal porosity of the graphite particles is higher in the lower half region than in the upper half region when the negative electrode mixture layer is divided into two equal parts in the thickness direction, the layer is relatively easily crushed. As a result, since the contact area and adhesion with a negative electrode current collector are increased in the lower half region, it is considered that the charge/discharge cycle characteristic of the secondary battery is also improved in this respect.

Hereinafter, examples of embodiments will be described in detail with reference to the drawings. A non-aqueous electrolyte secondary battery of the present disclosure is not limited to embodiments described below. In addition, the drawings referred to in the description of the embodiments are schematically illustrated.

Figure 1:
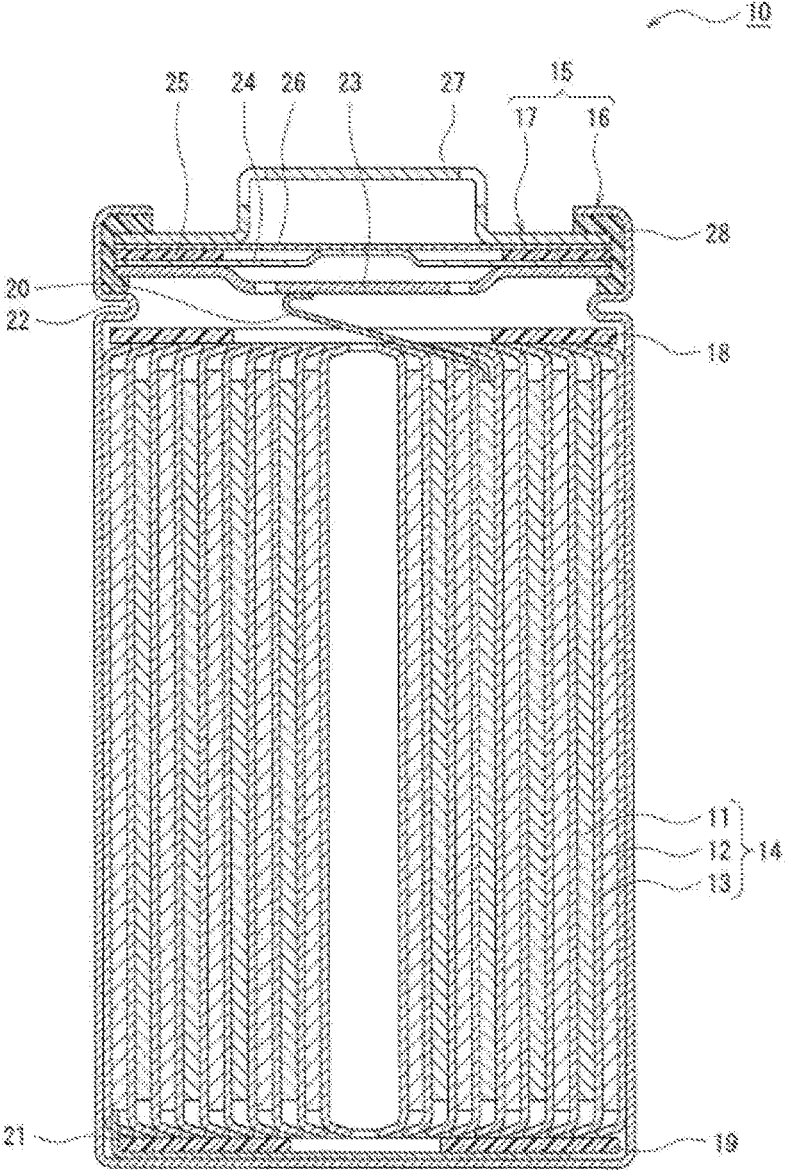
FIG. 1 is a cross-sectional view of a secondary battery as an example of an embodiment.

FIG. 1 is a cross-sectional view of a secondary battery as an example of an embodiment. A secondary battery 10 illustrated in FIG. 1 includes a wound electrode assembly 14 formed by wounding a positive electrode 11 and a negative electrode 12 with a separator 13 interposed between the positive electrode and the negative electrode, a non-aqueous electrolyte, insulating plates 18 and 19 that are disposed on upper and lower sides of the electrode assembly 14, respectively, and a battery case 15 housing the members. The battery case 15 includes a bottomed cylindrical case main body 16 and a sealing assembly 17 for closing an opening of the case main body 16. Instead of the wound electrode assembly 14, another form of an electrode assembly such as a stacked electrode assembly in which a positive electrode and a negative electrode are alternately stacked with a separator interposed therebetween may be applied. In addition, examples of the battery case 15 include a metal outer can having a cylindrical shape, a square shape, a coin shape, a button shape, or the like, and a pouch outer can formed by laminating a resin sheet and a metal sheet.

The case main body 16 is, for example, a bottomed cylindrical metal outer can. A gasket 28 is provided between the case main body 16 and the sealing assembly 17 to secure a sealing property of the inside of the battery. The case main body 16 has, for example, a projection part 22 in which a part of a side part thereof projects inside for supporting the sealing assembly 17. The projection part 22 is desirably formed in an annular shape along a circumferential direction of the case main body 16, and supports the sealing assembly 17 on an upper surface thereof.

The sealing assembly 17 has a structure in which a filter 23, a lower vent member 24, an insulating member 25, an upper vent member 26, and a cap 27 are sequentially stacked from the electrode assembly 14 side. Each member constituting the sealing assembly 17 has, for example, a disk shape or a ring shape, and the respective members except for the insulating member 25 are electrically connected to each other. The lower vent member 24 and the upper vent member 26 are connected to each other at the respective central parts thereof, and the insulating member 25 is interposed between the respective circumferential parts of the vent members 24 and 26. When the internal pressure of the secondary battery 10 is increased by heat generation due to an internal short circuit or the like, for example, the lower vent member 24 is deformed so as to push the upper vent member 26 up toward the cap 27 side and is broken, and thus, a current pathway between the lower vent member 24 and the upper vent member 26 is cut off. When the internal pressure is further increased, the upper vent member 26 is broken, and gas is discharged through the opening of the cap 27.

In the secondary battery 10 illustrated in FIG. 1, a positive electrode lead 20 attached to the positive electrode 11 extends through a through-hole of the insulating plate 18 toward a side of the sealing assembly 17, and a negative electrode lead 21 attached to the negative electrode 12 extends through the outside of the insulating plate 19 toward the bottom side of the case main body 16. The positive electrode lead 20 is connected to a lower surface of the filter 23 that is a bottom plate of the sealing assembly 17 by welding or the like, and the cap 27 that is a top plate of the sealing assembly 17 electrically connected to the filter 23 becomes a positive electrode terminal. The negative electrode lead 21 is connected to a bottom inner surface of the case main body 16 by welding or the like, and the case main body 16 becomes a negative electrode terminal.

Hereinafter, each component of the secondary battery 10 will be described in detail.

[Negative Electrode]

Figure 2:
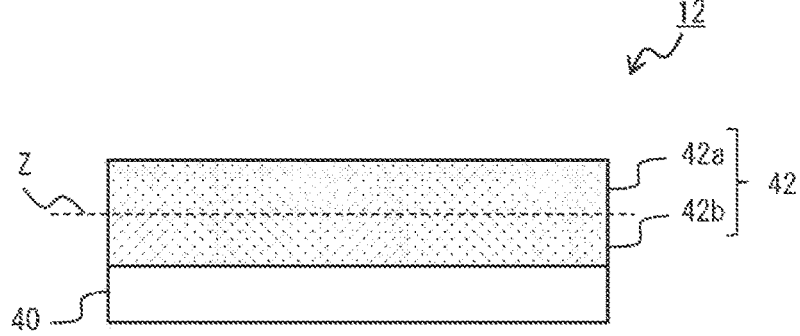
FIG. 2 is a cross-sectional view of a negative electrode as an example of an embodiment.

FIG. 2 is a cross-sectional view of a negative electrode as an example of an embodiment. The negative electrode 12 includes a negative electrode current collector 40 and a negative electrode mixture layer 42 provided on the negative electrode current collector 40.

Examples of the negative electrode current collector 40 include a foil of a metal stable in a potential range of the negative electrode, such as copper, and a film in which the metal is disposed on a surface layer.

The negative electrode mixture layer 42 includes a negative electrode active material including graphite particles and a Si-containing material. The negative electrode mixture layer desirably contains a binder material, an electrically conductive material, and the like. The negative electrode 12 can be manufactured by preparing a negative electrode mixture slurry containing a negative electrode active material, a binder material, and the like, applying the negative electrode mixture slurry over the negative electrode current collector 40, performing drying to form the negative electrode mixture layer 42, and rolling the negative electrode mixture layer 42. A method of manufacturing the negative electrode mixture layer 42 will be described in detail.

In the present embodiment, when the negative electrode mixture layer 42 illustrated in FIG. 2 is divided into two equal parts in a thickness direction, an average value of particle internal porosities of the graphite particles included in an upper half region 42a is less than or equal to 13%, and is smaller than an average value of particle internal porosities of the graphite particles included in a lower half region. The phrase "the negative electrode mixture layer 42 is divided into two equal parts in the thickness direction" means that when a lamination direction of the negative electrode current collector 40 and the negative electrode mixture layer 42 is defined as the thickness direction of the negative electrode mixture layer 42, the negative electrode mixture layer 42 is divided in half at the middle Z of a thickness of the negative electrode mixture layer 42. Then, when the negative electrode mixture layer 42 is divided into two equal parts in the thickness direction, the negative electrode mixture layer 42 positioned near the negative electrode current collector 40 is defined as a lower half region 42b, and the negative electrode mixture layer 42 positioned far from the negative electrode current collector 40 is defined as the upper half region 42a.

Figure 3:
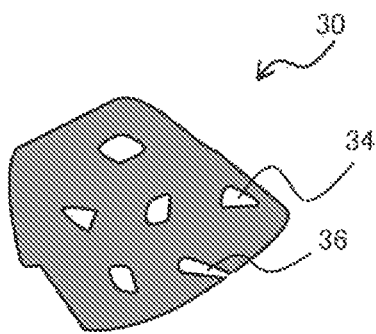
FIG. 3 is an enlarged view illustrating a cross section of a graphite particle in a negative electrode mixture layer.

FIG. 3 is an enlarged view illustrating a cross section of a graphite particle in a negative electrode mixture layer. In the present embodiment, as illustrated in FIG. 3, graphite particles 30 included in the negative electrode mixture layer have closed pores 34 (hereinafter, internal pores 34) that are not connected to particle surfaces from the inside of the particles and pores 36 (hereinafter, external pores 36) that are connected to the particle surface from the inside of the particles in a cross-sectional view of the graphite particle 30. Here, the particle internal porosity of the graphite particle is a two-dimensional value determined from a ratio of an area of the internal pores 34 of the graphite particles to a cross-sectional area of the graphite particles. Then, the average value of the particle internal porosities of the graphite particles included in the upper half region 42a or the lower half region 42b is determined by the following procedure.

<Method of Measuring Particle Internal Porosity>

(1) A cross section of the negative electrode mixture layer (upper half region 42a or lower half region 42b) is exposed. Examples of a method of exposing the cross section include a method of exposing the cross section of the negative electrode mixture layer by cutting a part of the negative electrode and machining the cut part with an ion milling apparatus (for example, IM4000PLUS manufactured by Hitachi High-Tech Corporation).

(2) Using a scanning electron microscope, a backscattered electron image of the exposed cross section of the negative electrode mixture layer (upper half region 42a or lower half region 42b) is captured. A magnification when the backscattered electron image is captured is 3,000 times to 5,000 times.

(3) A cross-sectional image acquired by the above-described process is read into a computer, a binarization process is applied using an image analyzing software (for example, ImageJ manufactured by National Institutes of Health), and a binarized image is acquired in which a particle cross section in the cross-sectional image is converted into black color and pores existing in the particle cross section are converted into white color.

(4) Graphite particles having a particle size of greater than or equal to 5 μm and less than or equal to 50 μm are selected from the binarized image, and the area of the graphite particle cross section and the area of the internal pores existing in the graphite particle cross section are calculated. Here, the area of the graphite particle cross section refers to an area of a region surrounded by an outer periphery of the graphite particle, that is, an area of all of the cross-sectional portions of the graphite particles. In addition, among the pores existing in the graphite particle cross section, for pores having a width of less than or equal to 3 μm, it may be difficult to judge whether the pore is the internal pore or the external pore in the image analysis, and thus, the pores having the width of less than or equal to 3 μm may be determined as internal pores Based on the calculated area of the graphite particle cross section and the calculated area of the internal pores of the graphite particle cross section, the particle internal porosity of the graphite particle is calculated (area of internal pores of the graphite particle cross section× 100/area of graphite particle cross section).

(5) The particle internal porosity is calculated for all the graphite particles having a particle size of greater than or equal to 5 μm and less than or equal to 50 μm existing in the cross-sectional image of the negative electrode mixture layer (the upper half region 42a or the lower half region 42b), and an average value is determined from the calculated particle internal porosity.

In the present embodiment, the average value of the particle internal porosities of the graphite particles included in the upper half region 42a of the negative electrode mixture layer 42 may be less than or equal to 13%, desirably greater than or equal to 2.5% and less than or equal to 13%, and more desirably greater than or equal to 2.5% and less than or equal to 5%, from the viewpoint of improving the charge/discharge cycle characteristic of the secondary battery. In addition, the average value of the particle internal porosities of the graphite particles included in the lower half region 42b of the negative electrode mixture layer 42 may be greater than the average value of the particle internal porosities of the graphite particles included in the upper half region 42a, and is desirably greater than or equal to 8% and less than or equal to 20%, and is more desirably greater than or equal to 10% and less than or equal to 18%.

In the present embodiment, graphite particles having any particle internal porosity may be included in the upper half region 42a of the negative electrode mixture layer 42 as long as the average value of the particle internal porosity of the graphite particles is less than or equal to 13%, and for example, it is desirable that graphite particles A having an internal porosity of less than or equal to 5% are included in terms of decreasing the average value of the particle internal porosity of the graphite particles included in the upper half region 42a. In addition, graphite particles having any particle internal porosity may be included in the lower half region 42b of the negative electrode mixture layer 42 as long as it is greater than the average value of the particle internal porosity of the graphite particles included in the upper half region 42a, and for example, it is desirable that graphite particles B having an internal porosity of greater than or equal to 8% and less than or equal to 20% are included in terms of increasing the average value of the particle internal porosity of the graphite particles included in the lower half region 42b.

In addition, in the present embodiment, for example, graphite particles B having an internal porosity of greater than or equal to 8% and less than or equal to 20% may be included in the upper half region 42a of the negative electrode mixture layer 42 as long as the average value of the particle internal porosity of the graphite particles is less than or equal to 13%. In addition, for example, graphite particles A having an internal porosity of less than or equal to 5% may be included in the lower half region 42b of the negative electrode mixture layer 42 as long as it is greater than the average value of the particle internal porosity of the graphite particles included in the upper half region 42a.

The internal porosity of the graphite particles A is desirably greater than or equal to 1% and less than or equal to 5% and is more desirably greater than or equal to 3% and less than or equal to 5%. The internal porosity of the graphite particles B is desirably greater than or equal to 10% and less than or equal to 18% and is more desirably greater than or equal to 12% and less than or equal to 16%.

The graphite particles A and B are manufactured, for example, as follows.

<Graphite Particles A Having Particle Internal Porosity of Less than or Equal to 5%>

For example, cokes (precursors) which are a primary raw material are ground to a predetermined size, and, in a state in which the cokes are aggregated with a binder material, the aggregate is baked at a temperature of higher than or equal to 2,600° C. for graphitization, and the resulting graphites are then filtered to obtain the graphite particles A of a desired size. Here, the particle internal porosity may be adjusted to less than or equal to 5% by a particle size of the precursor after the grinding, a particle size of the precursor in the aggregated state, or the like. For example, an average particle size (median size D50) of the precursors after the grinding is desirably in a range of greater than or equal to 12 μm and less than or equal to 20 μm. In addition, in order to reduce the particle internal porosity to a range of less than or equal to 5%, it is desirable to increase a particle size of the precursor after the grinding.

<Graphite Particles B Having Particle Internal Porosity of Greater Than or Equal To 8% and Less Than or Equal To 20%>

For example, cokes (precursors) which are a primary raw material are ground to a predetermined size, and, in a state in which the cokes are aggregated with a binder material and then the aggregate is pressurized and shaped into a block, the aggregate is baked at a temperature of higher than or equal to 2,600° C. for graphitization. The block-shape formation after the graphitization is ground and filtered, to obtain the graphite particles B of a desired size. The particle internal porosity can be adjusted to greater than or equal to 8% and less than or equal to 20% by an amount of volatile composition added to the block-shape formation. When a part of the binder material added to the cokes (precursors) vaporizes during the baking, the binder material may be used as the volatile composition. A pitch may be exemplified as such a binder material.

No particular limitation is imposed on the graphite particles A and B used in the present embodiment, such as natural graphite and artificial graphite, but from the viewpoint of ease of adjustment of the particle internal porosity, the artificial graphite is desirably employed. A plane spacing ($d_{002}$) of a (002) plane determined by an X-ray wide angle diffraction for the graphite particles A and B used in the present embodiment is desirably, for example, greater than or equal to 0.3354 nm, is desirably greater than or equal to 0.3357 nm, is desirably less than 0.340 nm, and is more desirably less than or equal to 0.338 nm. In addition, a crystallite size (Lc(002)) determined by the X-ray diffraction for the graphite particles A and B used in the present embodiment is desirably, for example, greater than or equal to 5 nm, is more desirably greater than or equal to 10 nm, is desirably less than or equal to 300 nm, and is more desirably less than or equal to 200 nm. When the plane spacing ($d_{002}$) and the crystallite size (Lc(002)) satisfy the above ranges, the battery capacity of the secondary battery tends to be larger than that when the above ranges are not satisfied.

In the present embodiment, the Si-containing material included in the negative electrode mixture layer 42 includes a Si-containing material A including a carbon phase and silicon particles dispersed in the carbon phase. A content of the Si-containing material A is, for example, desirably greater than or equal to 1 mass % and less than or equal to 30 mass %, is more desirably greater than or equal to 5 mass % and less than or equal to 20 mass %, and is still more desirably greater than or equal to 10 mass % and less than or equal to 20 mass %, with respect to a total mass of the negative electrode active material, from the viewpoint of improving the charge/discharge cycle characteristic of the secondary battery.

A content of the silicon particles in the Si-containing material A is desirably greater than or equal to 30 mass % and less than or equal to 80 mass %, is more desirably greater than or equal to 35 mass % and less than or equal to 75 mass %, and is still more desirably greater than or equal to 55 mass % and less than or equal to 70 mass %, from the viewpoint of high capacity and the like. The carbon phase of the Si-containing material A desirably contains crystalline carbon from the viewpoint of suppressing electrode plate breakage and the like during electrode plate manufacturing due to strength improvement.

An average particle size of the silicon particles is generally less than or equal to 500 nm, is desirably less than or equal to 200 nm, and is more desirably less than or equal to 100 nm before charging and discharging. After charging and discharging, the average particle size of the silicon particles is desirably less than or equal to 400 nm and is more desirably less than or equal to 100 nm. By miniaturizing the silicon particles, a volume change during charging and discharging is reduced, and the cycle characteristic is improved. The average particle size of the silicon particles is measured by observing a particle cross section of the Si-containing material A using a scanning electron microscope (SEM) or a transmission electron microscope (TEM), and is specifically determined as an average value of the longest sizes of 100 silicon particles.

In the present embodiment, the Si-containing material included in the negative electrode mixture layer 42 may include a Si-containing material B including a silicate phase and silicon particles dispersed in the silicate phase, in addition to the Si-containing material A.

A desirable Si-containing material B has, for example, a sea-island structure in which fine silicon particles are approximately uniformly dispersed in an amorphous silicate phase, and is represented by a general formula $SiO_x$ (0.5≤x≤1.6). A content of the silicon particles is desirably greater than or equal to 35 mass % and less than or equal to 75 mass % with respect to the total mass of the Si-containing material B from the viewpoint of improving the battery capacity. In addition, the average particle size of the silicon particles is generally less than or equal to 500 nm, is desirably less than or equal to 200 nm, and is more desirably less than or equal to 50 nm before charging and discharging.

The silicate phase of the Si-containing material B desirably contains at least one element of an alkali metal element and an alkaline earth metal element from the viewpoint of improving lithium ion conductivity and the like, and particularly desirably contains a lithium element. In addition, the silicate phase of the Si-containing material B desirably contains lithium silicate represented by a general formula $Li_{2z}SiO_{(2+z)}$ (0<z<2).

In addition, an electrically conductive layer formed of a material having high conductivity may be formed on surfaces of particles of the Si-containing material A or the Si-containing material B. An example of a desirable electrically conductive layer is a carbon coating formed of a carbon material. The carbon coating is formed of carbon black, acetylene black, Ketjen black, graphite, and a mixture of two or more thereof. Examples of a method of carbon-coating the surfaces of the particles of the Si-containing material include a CVD method using acetylene, methane or the like, and a method in which a coal pitch, a petroleum pitch, a phenol resin, or the like is mixed with the particles of the Si-containing material, and a thermal treatment is performed. Alternatively, the carbon coating may be formed by fixing a carbon powder such as the carbon black on the surface of the particle using a binder material.

A mass ratio (A/B) of the Si-containing material A to the Si-containing material B is desirably greater than or equal to 0.2 and less than or equal to 20, and is more desirably greater than or equal to 2 and less than or equal to 10, from the viewpoint of improving the charge/discharge cycle characteristic of the secondary battery.

A total content of the Si-containing materials is desirably greater than or equal to 5 mass % and less than or equal to 20 mass %, and is more desirably greater than or equal to 10 mass % and less than or equal to 15 mass %, with respect to the total mass of the negative electrode active material, from the viewpoint of improving the charge/discharge cycle characteristic of the secondary battery and improving the battery capacity.

Examples of the binder material include a fluorine-based resin, PAN, a polyimide-based resin, an acrylic resin, a polyolefin-based resin, styrene-butadiene rubber (SBR), carboxymethyl cellulose (CMC) or a salt thereof, polyacrylic acid (PAA) or a salt thereof (PAA-Na, PAA-K, and the like, or a partially neutralized salt may be used), and polyvinyl alcohol (PVA). These materials may be used alone or in combination of two or more thereof.

Examples of the electrically conductive material include carbon materials such as carbon black (CB), acetylene black (AB), Ketjen black, carbon nanotubes (CNT), and graphite. These materials may be used alone or in combination of two or more thereof.

An example of a method of manufacturing the negative electrode mixture layer 42 will be described. For example, a negative electrode active material including the graphite particles B and the Si-containing material A (the Si-containing material B as necessary), a binder material, and the like are mixed together with a solvent such as water to prepare a negative electrode mixture slurry for the lower half region 42*b*. For example, the graphite particles A may be added to the slurry in order to adjust the average value of the internal porosities of the graphite particles. In addition, in addition to the slurry, a negative electrode active material including the graphite particles A and the Si-containing material A (the Si-containing material B as necessary), a binder material, and the like are mixed together with a solvent such as water to prepare a negative electrode mixture slurry for the upper half region 42a. For example, the graphite particles B may be added to the slurry in order to adjust the average value of the internal porosities of the graphite particles. The negative electrode mixture slurry for the lower half region 42b is applied over both surfaces of the negative electrode current collector 40 and the applied film is dried, and then the negative electrode mixture slurry for the upper half region 42a is applied over both surfaces of the applied film obtained by the negative electrode mixture slurry for the lower half region 42b and the applied film is dried, such that the negative electrode mixture layer 42 can be formed. In the above method, although the negative electrode mixture slurry for the lower half region 42b is applied and dried, and then the negative electrode mixture slurry for the upper half region 42a is applied, a method in which the negative electrode mixture slurry for the lower half region 42b is applied and then the negative electrode mixture slurry for the upper half region 42a is applied after drying may be used, and the negative electrode mixture slurry for the lower half region 42b and the negative electrode mixture slurry for the upper half region 42a may be simultaneously applied.

[Positive Electrode]

The positive electrode 11 includes, for example, a positive electrode current collector such as a metal foil and a positive electrode mixture layer formed on the positive electrode current collector. As the positive electrode current collector, a foil of a metal stable in a potential range of the positive electrode, such as aluminum, a film in which the metal is disposed on a surface layer, or the like can be used. The positive electrode mixture layer includes, for example, a positive electrode active material, a binder material, an electrically conductive material, and the like.

The positive electrode 11 can be manufactured, for example, by performing a compression process of applying the positive electrode mixture slurry including the positive electrode active material, the binder material, the electrically conductive material, and the like, over the positive electrode current collector and drying the applied film to form a positive electrode mixture layer, and then compressing the positive electrode mixture layer by a rolling roller.

Examples of the positive electrode active material include lithium transition metal oxides containing transition metal elements such as Co, Mn, and Ni. The lithium transition metal oxide is, for example, $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, or $Li_2MPO_4F$ (M; at least one of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$). These lithium transition metal oxides may be used alone or in combination of multiple types. From the viewpoint that a high capacity of the secondary battery can be achieved, it is desirable that the positive electrode active material contains a lithium nickel composite oxide such as $Li_xNiO_2$, $Li_xCo_yNi_{1-y}O_2$, or $Li_xNi_{1-y}M_yO_z$ (M; at least one of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$).

Examples of the electrically conductive material include carbon materials such as carbon black (CB), acetylene black (AB), Ketjen black, carbon nanotubes (CNT), and graphite. These materials may be used alone or in combination of two or more thereof.

Examples of the binder material include a fluorine-based resin such as polytetrafluoroethylene (PTFE) or polyvinylidene fluoride (PVdF), polyacrylonitrile (PAN), a polyimide-based resin, an acrylic resin, and a polyolefin-based resin. These materials may be used alone or in combination of two or more thereof.

[Separator]

For example, a porous sheet having an ion permeation property and an insulation property is used for the separator 13. Specific examples of the porous sheet include a fine porous thin film, a woven fabric, and a non-woven fabric. As a material of the separator, an olefin-based resin such as polyethylene or polypropylene, cellulose, and the like are desirable. The separator 13 may be a laminate including a cellulose fiber layer and a thermoplastic resin fiber layer formed of an olefin-based resin or the like. In addition, a multi-layer separator including a polyethylene layer and a polypropylene layer may be used, or a separator obtained by applying a material such as an aramid-based resin or ceramic over a surface of the separator may be used.

[Non-Aqueous Electrolyte]

The non-aqueous electrolyte contains a non-aqueous solvent and an electrolyte salt dissolved in the non-aqueous solvent. As the non-aqueous solvent, for example, esters, ethers, nitriles such as acetonitrile, amides such as dimethylformamide, a mixed solvent of two or more thereof, and the like can be used. The non-aqueous solvent may contain a halogen-substituted product in which at least some hydrogens in these solvents are substituted with halogen atoms such as fluorine.

Examples of the esters include cyclic carbonates such as ethylene carbonate (EC), propylene carbonate (PC), and butylene carbonate, chain carbonates such as dimethyl carbonate (DMC), ethyl methyl carbonate (EMC), diethyl carbonate (DEC), methyl propyl carbonate, ethyl propyl carbonate, and methyl isopropyl carbonate, cyclic carboxylic acid esters such as γ-butyrolactone and γ-valerolactone, and chain carboxylic acid esters such as methyl acetate, ethyl acetate, propyl acetate, methyl propionate (MP), ethyl propionate, and γ-butyrolactone.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ether, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

As the halogen-substituted product, fluorinated cyclic carbonate ester such as fluoroethylene carbonate (FEC), fluorinated chain carboxylic acid ester such fluorinated chain carbonate ester or methyl fluoropropionate (FMP), and the like are desirably used.

The electrolyte salt is desirably a lithium salt. Examples of the lithium salt include borates such as $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(CnF_{2n+1})_x$ ($1<x<6$, n is 1 or 2), $LiB_{10}Cl_{10}$, $LiCl$, $LiBr$, $LiI$, lithium chloroborane, lithium lower aliphatic carboxylate, $Li_2B_4O_7$, and $Li(B(C_2O_4)F_2)$, and imide salts such as $LiN(SO_2CF_3)_2$ and $LiN$ $(CiF_{2l+1}SO_2)(CmF_{2m+1}SO_2)$ {l and m are integers greater than or equal to 1}. These lithium salts may be used alone or in combination of multiple types. Among them, $LiPF_6$ is desirably used from the viewpoint of ion conductivity, electrochemical stability, and the like. A concentration of the lithium salt is desirably greater than or equal to 0.8 mol and less than or equal to 1.8 mol per 1 L of the solvent.

EXAMPLES

Hereinafter, the present disclosure will be further described with reference to Examples, but the present disclosure is not limited to these Examples.

Example 1

[Manufacturing of Negative Electrode]

94 parts by mass of graphite particles B having a particle internal porosity of greater than or equal to 8% and less than or equal to 20% and 6 parts by mass of a Si-containing material A in which silicon particles were dispersed in a carbon phase were mixed, and the mixture was used as a negative electrode active material A. The negative electrode active material A, carboxymethylcellulose sodium (CMC-Na), and styrene-butadiene copolymer rubber (SBR) were mixed so that a mass ratio of the negative electrode active material A:carboxymethylcellulose sodium (CMC-Na):styrene-butadiene copolymer rubber (SBR) was 100:1:1, thereby preparing a slurry. This slurry was used as a negative electrode mixture slurry for a lower half region. In addition, 38 parts by mass of graphite particles A having a particle internal porosity of less than or equal to 5%, 56 parts by mass of graphite particles B having a particle internal porosity of greater than or equal to 8% and less than or equal to 20%, and 6 parts by mass of a Si-containing material A in which silicon particles were dispersed in a carbon phase were mixed, and the mixture was used as a negative electrode active material B. The negative electrode active material B, carboxymethylcellulose sodium (CMC-Na), and styrene-butadiene copolymer rubber (SBR) were mixed so that a mass ratio of the negative electrode active material A:carboxymethylcellulose sodium (CMC-Na):styrene-butadiene copolymer rubber (SBR) was 100:1:1, thereby preparing a slurry. This slurry was used as a negative electrode mixture slurry for an upper half region.

The negative electrode mixture slurry for the lower half region was applied over both surfaces of a copper foil having a thickness of 8 μm, the applied film was dried, the negative electrode mixture slurry for the upper half region was applied over the applied film, the applied film was dried, and then the applied film was rolled by a rolling roller, thereby manufacturing a negative electrode in which a negative electrode mixture layer was formed on both surfaces of a negative electrode current collector. In addition, in the manufactured negative electrode, an average value of internal porosities of the graphite particles was measured. As a result, when the negative electrode mixture layer was divided into two equal parts in a thickness direction, the average value of the particle internal porosities of the graphite particles included in the upper half region was 13%, and the average value of the particle internal porosities of the graphite particles included in the lower half region was 14%.

[Manufacturing of Positive Electrode]

As a positive electrode active material, an aluminum-containing lithium nickel cobalt oxide $(LiNi_{0.88}Co_{0.09}Al_{0.03}O_2)$ was used. 100 parts by mass of the positive electrode active material, 1 part by mass of acetylene black, and 0.9 parts by mass of polyvinylidene fluoride were mixed in a solvent of N-methyl-2-pyrrolidone (NMP), thereby preparing a positive electrode mixture slurry. The slurry was applied over both surfaces of an aluminum foil having a thickness of 15 μm, the applied film was dried, and then the applied film was rolled by a rolling roller, thereby manufacturing a positive electrode in which a positive electrode mixture layer was formed on both surfaces of a positive electrode current collector.

[Manufacturing of Non-Aqueous Electrolyte]

To a non-aqueous solvent obtained by mixing ethylene carbonate (EC), methyl ethyl carbonate (MEC), and dimethyl carbonate (DMC) at a volume ratio of 20:5:75, $LiPF_6$ was dissolved at a concentration of 1.4 mol/L, and 3 mass % of vinylene carbonate and 0.5 mass % of 1,6-diisocyanate hexane were further added. This was used as anon-aqueous electrolyte.

[Manufacturing of Secondary Battery]

(1) An aluminum positive electrode lead was attached to a positive electrode current collector, a nickel-copper-nickel negative electrode lead was attached to a negative electrode current collector, and then, a positive electrode and a negative electrode were wound with a polyethylene separator interposed therebetween, thereby manufacturing a wound electrode assembly.

(2) Insulating plates were disposed on upper and lower sides of the electrode assembly, respectively, a negative electrode lead was welded to a case main body, a positive electrode lead was welded to a sealing assembly, and the electrode assembly was housed in the case main body.

(3) A non-aqueous electrolyte was injected into the case main body by a pressure reduction method, and then, an end part of an opening of the case main body was sealed with the sealing assembly via a gasket. This was used as a secondary battery.

Example 2

A secondary battery was manufactured in the same manner as that of Example 1, except that a mixture of 93.6 parts by mass of graphite particles B having a particle internal porosity of greater than or equal to 8% and less than or equal to 20%, 2.3 parts by mass of a Si-containing material A in which silicon particles were dispersed in a carbon phase, and 4.1 parts by mass of a Si-containing material B in which silicon particles were dispersed in a silicate phase was used as the negative electrode active material A used for the negative electrode mixture slurry for the lower half region, and a mixture of 37.4 parts by mass of graphite particles A having a particle internal porosity of less than or equal to 5%, 56.2 parts by mass of graphite particles B having a particle internal porosity of greater than or equal to 8% and less than or equal to 20%, 2.3 parts by mass of a Si-containing material A in which silicon particles were dispersed in a carbon phase, and 4.1 parts by mass of a Si-containing material B in which silicon particles were dispersed in a silicate phase was used as the negative electrode active material B used for the negative electrode mixture slurry for the upper half region.

In the negative electrode manufactured in Example 2, when the negative electrode mixture layer was divided into two equal parts in a thickness direction, the average value of the particle internal porosities of the graphite particles included in the upper half region was 9%, and the average value of the particle internal porosities of the graphite particles included in the lower half region was 14%.

Example 3

A secondary battery was manufactured in the same manner as that of Example 1, except that a mixture of 93.6 parts by mass of graphite particles B having a particle internal porosity of greater than or equal to 8% and less than or equal to 20%, 2.3 parts by mass of a Si-containing material A in which silicon particles were dispersed in a carbon phase, and 4.1 parts by mass of a Si-containing material B in which silicon particles were dispersed in a silicate phase was used as the negative electrode active material A used for the negative electrode mixture slurry for the lower half region, and a mixture of 37.4 parts by mass of graphite particles A having a particle internal porosity of less than or equal to 5%, 56.2 parts by mass of graphite particles B having a particle internal porosity of greater than or equal to 8% and less than or equal to 20%, 2.3 parts by mass of a Si-containing material A in which silicon particles were dispersed in a carbon phase, and 4.1 parts by mass of a Si-containing material B in which silicon particles were dispersed in a silicate phase was used as the negative electrode active material B used for the negative electrode mixture slurry for the upper half region.

In the negative electrode manufactured in Example 3, when the negative electrode mixture layer was divided into two equal parts in a thickness direction, the average value of the particle internal porosities of the graphite particles included in the upper half region was 13%, and the average value of the particle internal porosities of the graphite particles included in the lower half region was 14%.

Example 4

A secondary battery was manufactured in the same manner as that of Example 1, except that a mixture of 95.0 parts by mass of graphite particles B having a particle internal porosity of greater than or equal to 8% and less than or equal to 20%, 1.0 part by mass of a Si-containing material A in which silicon particles were dispersed in a carbon phase, and 4.0 parts by mass of a Si-containing material B in which silicon particles were dispersed in a silicate phase was used as the negative electrode active material A used for the negative electrode mixture slurry for the lower half region, and a mixture of 38 parts by mass of graphite particles A having a particle internal porosity of less than or equal to 5%, 57 parts by mass of graphite particles B having a particle internal porosity of greater than or equal to 8% and less than or equal to 20%, 1.0 part by mass of a Si-containing material A in which silicon particles were dispersed in a carbon phase, and 4.0 parts by mass of a Si-containing material B in which silicon particles were dispersed in a silicate phase was used as the negative electrode active material B used for the negative electrode mixture slurry for the upper half region.

In the negative electrode manufactured in Example 4, when the negative electrode mixture layer was divided into two equal parts in a thickness direction, the average value of the particle internal porosities of the graphite particles included in the upper half region was 9%, and the average value of the particle internal porosities of the graphite particles included in the lower half region was 14%.

Example 5

A secondary battery was manufactured in the same manner as that of Example 1, except that a mixture of 80 parts by mass of graphite particles B having a particle internal porosity of greater than or equal to 8% and less than or equal to 20%, 19 parts by mass of a Si-containing material A in which silicon particles were dispersed in a carbon phase, and 1 part by mass of a Si-containing material B in which silicon particles were dispersed in a silicate phase was used as the negative electrode active material A used for the negative electrode mixture slurry for the lower half region, and a mixture of 32 parts by mass of graphite particles A having a particle internal porosity of less than or equal to 5%, 48 parts by mass of graphite particles B having a particle internal porosity of greater than or equal to 8% and less than or equal to 20%, 19 parts by mass of a Si-containing material A in which silicon particles were dispersed in a carbon phase, and 1 part by mass of a Si-containing material B in which silicon particles were dispersed in a silicate phase was used as the negative electrode active material B used for the negative electrode mixture slurry for the upper half region.

In the negative electrode manufactured in Example 5, when the negative electrode mixture layer was divided into two equal parts in a thickness direction, the average value of the particle internal porosities of the graphite particles included in the upper half region was 9%, and the average value of the particle internal porosities of the graphite particles included in the lower half region was 14%.

Comparative Example 1

A secondary battery was manufactured in the same manner as that of Example 1, except that the negative electrode mixture slurry for the upper half region used in Example 1 was applied over both surfaces of a copper foil having a thickness of 8 μm, the applied film was dried, and then the applied film was rolled by a rolling roller to manufacture a negative electrode in which a negative electrode mixture layer was formed on both surfaces of a negative electrode current collector.

In the negative electrode manufactured in Comparative Example 1, when the negative electrode mixture layer was divided into two equal parts in a thickness direction, the average value of the particle internal porosities of the graphite particles included in the upper half region was 13%, and the average value of the particle internal porosities of the graphite particles included in the lower half region was 13%.

Comparative Example 2

A secondary battery was manufactured in the same manner as that of Example 1, except that the negative electrode mixture slurry for the lower half region used in Example 1 was applied over both surfaces of a copper foil having a thickness of 8 μm, the applied film was dried, and then the applied film was rolled by a rolling roller to manufacture a negative electrode in which a negative electrode mixture layer was formed on both surfaces of a negative electrode current collector.

In the negative electrode manufactured in Comparative Example 2, when the negative electrode mixture layer was divided into two equal parts in a thickness direction, the average value of the particle internal porosities of the graphite particles included in the upper half region was 14%, and the average value of the particle internal porosities of the graphite particles included in the lower half region was 14%.

Comparative Example 3

A secondary battery was manufactured in the same manner as that of Example 1, except that a mixture of 94 parts by mass of graphite particles B having a particle internal porosity of greater than or equal to 8% and less than or equal to 20% and 6 parts by mass of a Si-containing material A in which silicon particles were dispersed in a carbon phase was used as the negative electrode active material A used for the negative electrode mixture slurry for the lower half region, and a mixture of 38 parts by mass of graphite particles A having a particle internal porosity of less than or equal to 5%, 56 parts by mass of graphite particles B having a particle internal porosity of greater than or equal to 8% and less than or equal to 20%, and 6 parts by mass of a Si-containing material A in which silicon particles were dispersed in a carbon phase was used as the negative electrode active material B used for the negative electrode mixture slurry for the upper half region.

In the negative electrode manufactured in Comparative Example 3, when the negative electrode mixture layer was divided into two equal parts in a thickness direction, the average value of the particle internal porosities of the graphite particles included in the upper half region was 14%, and the average value of the particle internal porosities of the graphite particles included in the lower half region was 16%.

Comparative Example 4

A secondary battery was manufactured in the same manner as that of Example 1, except that a mixture of 94 parts by mass of graphite particles B having a particle internal porosity of greater than or equal to 8% and less than or equal to 20% and 6 parts by mass of a Si-containing material B in which silicon particles were dispersed in a silicate phase was used as the negative electrode active material A used for the negative electrode mixture slurry for the lower half region, and a mixture of 38 parts by mass of graphite particles A having a particle internal porosity of less than or equal to 5%, 56 parts by mass of graphite particles B having a particle internal porosity of greater than or equal to 8% and less than or equal to 20%, and 6 parts by mass of a Si-containing material B in which silicon particles were dispersed in a silicate phase was used as the negative electrode active material B used for the negative electrode mixture slurry for the upper half region.

In the negative electrode manufactured in Comparative Example 4, when the negative electrode mixture layer was divided into two equal parts in a thickness direction, the average value of the particle internal porosities of the graphite particles included in the upper half region was 13%, and the average value of the particle internal porosities of the graphite particles included in the lower half region was 14%.

Comparative Example 5

A secondary battery was manufactured in the same manner as that of Example 1, except that a mixture of 80 parts by mass of graphite particles B having a particle internal porosity of greater than or equal to 8% and less than or equal to 20% and 20 parts by mass of a Si-containing material B in which silicon particles were dispersed in a silicate phase was used as the negative electrode active material A used for the negative electrode mixture slurry for the lower half region, and a mixture of 32 parts by mass of graphite particles A having a particle internal porosity of less than or equal to 5%, 48 parts by mass of graphite particles B having a particle internal porosity of greater than or equal to 8% and less than or equal to 20%, and 20 parts by mass of a Si-containing material B in which silicon particles were dispersed in a silicate phase was used as the negative electrode active material B used for the negative electrode mixture slurry for the upper half region.

In the negative electrode manufactured in Comparative Example 5, when the negative electrode mixture layer was divided into two equal parts in a thickness direction, the average value of the particle internal porosities of the graphite particles included in the upper half region was 9%, and the average value of the particle internal porosities of the graphite particles included in the lower half region was 14%.

[Charge/Discharge Cycle Test]

Each of the secondary batteries of Examples and Comparative Examples was subjected to constant current charge at a constant current of 0.5 It until a battery voltage reached 4.2 V, and then was subjected to constant voltage charge at 4.2 V until a battery current reached 1/100 It, under a temperature environment at 25° C. Thereafter, constant current discharge was performed at a constant current of 0.5 It until a battery voltage reached 2.5 V. This charge/discharge cycle was repeated 450 times, and a capacity retention rate was calculated by the following equation.

Capacity retention rate (%)=(450th cycle discharge capacity/1st cycle discharge capacity)×100

The results of the capacity retention rates of the secondary batteries of Examples and Comparative Examples are summarized in Table 1. The higher the value of the capacity retention rate, the more improved the charge/discharge cycle characteristic of the secondary battery.

TABLE 1

| | Average value of particle internal porosities of graphite particles | | Content of Si-containing material A (carbon phase dispersed Si particle material) wt % | Content of Si-containing material B (silicate phase dispersed Si particle material) wt % | Capacity retention rate % |
|---|---|---|---|---|---|
| | Upper half region (%) | Lower half region (%) | | | |
| Example 1 | 13 | 14 | 6.0 | 0.0 | 70.6 |
| Example 2 | 9 | 14 | 2.3 | 4.1 | 74.8 |
| Example 3 | 13 | 14 | 2.3 | 4.1 | 71.2 |
| Example 4 | 9 | 14 | 1.0 | 4.0 | 71.2 |
| Example 5 | 9 | 14 | 19.0 | 1.0 | 52.9 |
| Comparative Example 1 | 13 | 13 | 6.0 | 0.0 | 69.7 |
| Comparative Example 2 | 14 | 14 | 6.0 | 0.0 | 69.4 |

TABLE 1-continued

| | Average value of particle internal porosities of graphite particles | | Content of Si-containing material A (carbon phase dispersed Si particle material) wt % | Content of Si-containing material B (silicate phase dispersed Si particle material) wt % | Capacity retention rate % |
|---|---|---|---|---|---|
| | Upper half region (%) | Lower half region (%) | | | |
| Comparative Example 3 | 14 | 16 | 6.0 | 0.0 | 61.6 |
| Comparative Example 4 | 13 | 14 | 0.0 | 6.0 | 58.6 |
| Comparative Example 5 | 9 | 14 | 0.0 | 20.0 | 46.1 |

As can be seen from Table 1, in all of Examples 1 to 4, the value of the capacity retention rate was higher than those in Comparative Examples 1 to 4 in which the same amount of the Si-containing material was included. In addition, in Example 5, the value of the capacity retention rate was higher than that in Comparative Example 5 in which the same amount of the Si-containing material was included. Therefore, it can be said that when the negative electrode active material including graphite particles and the Si-containing material A in which silicon particles were dispersed in the carbon phase was used, and the negative electrode mixture layer was divided into two equal parts in the thickness direction, the charge/discharge cycle characteristic of the secondary battery was improved by setting the average value of the particle internal porosity of the graphite particles included in the upper half region to less than or equal to 13% to be smaller than the average value of the particle internal porosity of the graphite particles included in the lower half region.

REFERENCE SIGNS LIST

10 Secondary battery
11 Positive electrode
12 Negative electrode
13 Separator
14 Electrode assembly
15 Battery case
16 Case main body
17 Sealing assembly
18, 19 Insulating plate
20 Positive electrode lead
21 Negative electrode lead
22 Projection part
23 Filter
24 Lower vent member
25 Insulating member
26 Upper vent member
27 Cap
28 Gasket
30 Graphite particles
34 Internal pore
36 External pore
40 Negative electrode current collector
42 Negative electrode mixture layer
42a Upper half region
42b Lower half region
The invention claimed is:
1. A negative electrode for a secondary battery comprising:

a negative electrode mixture layer including a negative electrode active material including graphite particles and a Si-containing material,
wherein the Si-containing material includes a Si-containing material A including a carbon phase and silicon particles dispersed in the carbon phase, and
when the negative electrode mixture layer is divided into two equal parts in a thickness direction, an average value of particle internal porosities of the graphite particles included in an upper half region is less than or equal to 13%, and is smaller than an average value of particle internal porosities of the graphite particles included in a lower half region,
wherein the Si-containing material includes a Si-containing material B including a silicate phase and silicon particles dispersed in the silicate phase.
2. The negative electrode for a secondary battery according to claim 1, wherein the average value of the particle internal porosities of the graphite particles included in the upper half region is greater than or equal to 2.5% and less than or equal to 13%, and the average value of the particle internal porosities of the graphite particles included in the lower half region is greater than or equal to 8% and less than or equal to 20%.
3. The negative electrode for a secondary battery according to claim 1, wherein a mass ratio (A/B) of the Si-containing material A to the Si-containing material B is greater than or equal to 0.2 and less than or equal to 20.
4. The negative electrode for a secondary battery according to claim 1, wherein a total content of the Si-containing material is greater than or equal to 5 mass % and less than or equal to 20 mass % with respect to a total mass of the negative electrode active material.
5. The negative electrode for a secondary battery according to claim 1, wherein the carbon phase of the Si-containing material A contains crystalline carbon.
6. The negative electrode for a secondary battery according to claim 1, wherein the silicate phase of the Si-containing material B contains at least one element of an alkali metal element and an alkaline earth metal element.
7. The negative electrode for a secondary battery according to claim 1, wherein the silicate phase of the Si-containing material B contains lithium silicate represented by a general formula $Li_{2z}SiO_{(2+z)}$, wherein $0<z<2$.
8. A secondary battery comprising a positive electrode, a negative electrode, and a non-aqueous electrolyte,
wherein the negative electrode is the negative electrode for a secondary battery according to claim 1.

* * * * *